United States Patent
Zhou et al.

(10) Patent No.: US 12,301,293 B2
(45) Date of Patent: May 13, 2025

(54) METHOD AND APPARATUS FOR LINEAR FREQUENCY MODULATION OF LARGE DYNAMIC RANGE WITH SINGLE SIDE BAND IQ MODULATOR FOR COHERENT LIDARS

(71) Applicant: Intel Corporation, Santa Clara, CA (US)

(72) Inventors: Jianying Zhou, Dublin, CA (US); Jin Hong, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 17/468,878

(22) Filed: Sep. 8, 2021

(65) Prior Publication Data

US 2021/0409122 A1 Dec. 30, 2021

Related U.S. Application Data

(60) Provisional application No. 63/195,307, filed on Jun. 1, 2021.

(51) Int. Cl.
*H04B 10/516* (2013.01)
*H04B 10/40* (2013.01)
*H04B 10/64* (2013.01)

(52) U.S. Cl.
CPC .......... *H04B 10/516* (2013.01); *H04B 10/40* (2013.01); *H04B 10/64* (2013.01)

(58) Field of Classification Search
CPC ..... H04B 10/516; H04B 10/40; G01S 7/4911; G01S 17/34

USPC ......................................................... 398/135
See application file for complete search history.

(56) References Cited

U.S. PATENT DOCUMENTS

| 4,160,958 | A | * | 7/1979 | Mims ................... H03L 7/0814 |
| | | | | 331/4 |
| 5,173,707 | A | * | 12/1992 | Mangiapane .......... G01S 13/90 |
| | | | | 342/149 |
| 6,034,642 | A | * | 3/2000 | Kojima ................. G01S 13/931 |
| | | | | 343/753 |

(Continued)

FOREIGN PATENT DOCUMENTS

| CA | 3226582 A1 * | 9/2023 | ......... G01D 5/35316 |
| JP | 2005073262 A * | 3/2005 | ........... H04B 10/505 |

(Continued)

OTHER PUBLICATIONS

Jessica Shea Choksey, "What is LiDAR, and How Does It Work?", J.D. Power, 2019, pp. 1-12.

*Primary Examiner* — Abbas H Alagheband
(74) *Attorney, Agent, or Firm* — Essential Patents Group, LLP

(57) ABSTRACT

In an embodiment, an apparatus includes: a modulator to modulate an optical signal with a frequency modulated (FM) signal according to IQ single sideband (SSB) modulation to output a modulated optical signal; an integrated optical transceiver to transmit the modulated optical signal and receive a reflection of the transmitted modulated optical signal; and a bandpass filter coupled to at least one of the modulator or the optical transceiver to filter at least one of the modulated optical signal or the reflection of the transmitted modulated optical signal. Other embodiments are described and claimed.

19 Claims, 8 Drawing Sheets

(56) References Cited

U.S. PATENT DOCUMENTS

| | | | |
|---|---|---|---|
| 10,620,266 B2 | 4/2020 | Shanbhogue et al. | |
| 2006/0028356 A1* | 2/2006 | Pieralli | G08B 13/2491 |
| | | | 340/905 |
| 2011/0299576 A1* | 12/2011 | Mikhemar | H04B 1/38 |
| | | | 375/350 |
| 2014/0241731 A1* | 8/2014 | Peach | H04B 10/11 |
| | | | 398/139 |
| 2019/0149191 A1* | 5/2019 | Shmel | H04B 1/7174 |
| | | | 375/139 |
| 2021/0018598 A1 | 1/2021 | Rakuljic | |

FOREIGN PATENT DOCUMENTS

| | | | | |
|---|---|---|---|---|
| TW | 201220730 A * | 5/2012 | | G06F 1/163 |
| WO | WO-2005091532 A1 * | 9/2005 | | G02B 6/12 |
| WO | WO-2017077612 A1 * | 5/2017 | | |

* cited by examiner

METHOD AND APPARATUS FOR LINEAR FREQUENCY MODULATION OF LARGE DYNAMIC RANGE WITH SINGLE SIDE BAND IQ MODULATOR FOR COHERENT LIDARS

This application claims priority to U.S. Provisional Patent Application No. 63/195,307, filed on Jun. 1, 2021, in the names of Jianying Zhou and Jin Hong, entitled "Method And Apparatus For Linear Frequency Modulation Of Large Dynamic Range With Single Side Band IQ Modulator For Coherent Lidars," the disclosure of which is hereby incorporated by reference.

BACKGROUND

There has been increased adoption of light detection and ranging (LIDAR) sensors, which is expected to accelerator over the foreseeable future. One typical use case is in connection with autonomous vehicles. However, quality of images resulting from LIDAR can be less than desired, in part due to nonlinearities in the components inherent in such sensors.

DETAILED DESCRIPTION

Embodiments described herein may include apparatus, systems, techniques, or processes that are directed to frequency modulation with a single side band (SSB) IQ modulator which has a frequency of nonlinear signals higher than a stop frequency of a linear frequency sweep signal of the frequency modulation. As a result, in embodiments, the nonlinear signals may be filtered by either an optical bandpass filter (BPF) and/or a radio frequency (RF) BPF.

Embodiments described herein may result in linear frequency modulation with a large dynamic range that improves resolution and accuracy of LIDAR detection as compared with legacy implementations. These embodiments overcome the nonlinear limitations from conventional SSB IQ modulators. Various embodiments may be implemented as an on-chip optical bandpass filter in a photonic integrated circuit (PIC) at a transmitter after IQ modulator, or an on-chip RF bandpass filter in an integrated circuit (IC) at a receiver circuit after photodetectors.

Linear frequency modulation may be used for coherent frequency modulated continuous wave (FMCW) LIDAR. SSB IQ modulators provide a simple and fast frequency modulation, but in legacy implementations may exhibit high nonlinearity for a large dynamic range, which may degrade the accuracy and resolution of LIDAR detection. This nonlinearity results in high order nonlinear signals which degrade the linear FM signals and thus degrade the resolution and accuracy of LIDAR detection. Legacy implementations may use a low swing voltage, or pre-equalization, to improve linearity of frequency modulation. However, these approaches may impact the dynamic range of linear frequency modulation, or may require complicated calibration procedures.

Figure 1:
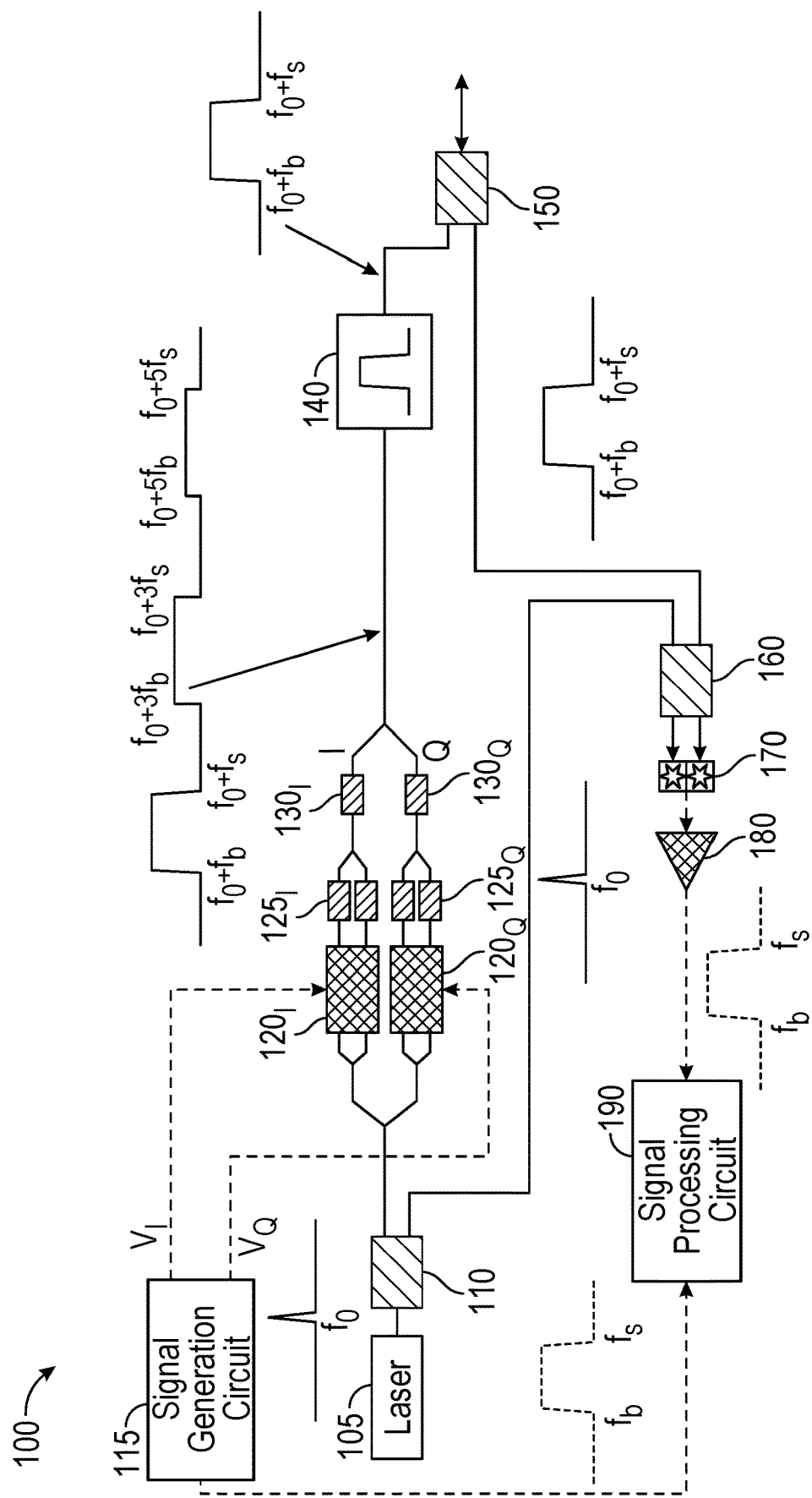
FIG. 1 is a block diagram of an apparatus in accordance with an embodiment.

Referring now to FIG. 1, shown is a block diagram of an apparatus in accordance with an embodiment. As shown in FIG. 1, apparatus 100 is a portion of a LIDAR system that may be used to detect range and speed information of objects in a vicinity. As shown, apparatus 100 incudes a laser 105, which may be implemented as a wavelength tunable CW laser with a narrow linewidth. Of course other light sources may instead be provided. The optical energy output by laser 105, which is output at an optical frequency of $f_o$, is provided to an optical splitter 110. Optical splitter 110 may be implemented as a 1×2 optical splitter or 2×2 multimode interferometer (MMI) to split the optical energy into two paths, namely a transmit path that is provided to modulator circuitry and a receive path that is provided to receive path circuitry.

With respect to the transmit path circuitry, the optical energy is provided to a complex modulator, namely an IQ SSB modulator $120_{I,Q}$, which may be implemented as a phase shifter for frequency modulation (FM). As seen, modulator 120 modulates the incoming optical energy with a modulation signal, namely a FM signal output from a signal generation circuit 115. In an embodiment, signal generation circuit 115 may be implemented as a controller or other hardware circuit to execute instructions to generate this FM signal, e.g., in the form of a linear sweep signal that sweeps from a begin frequency $f_b$ to a stop frequency $f_s$. In some embodiments, signal generation circuit 115 also may include control circuitry to control parameters of the signal generation, filter capabilities and other aspects of apparatus 100.

Additional phase control of this modulated signal may be performed in cascaded DC phase shifters $125_{I,Q}$ and $130_{I,Q}$ to achieve SSB IQ modulation. Note that at this point, the output modulated optical signal has nonlinearities due to harmonics. These harmonics are illustrated in the waveform shown in FIG. 1, where undesired noise is present at frequencies greater than $f_o+f_s$, such as third order and fifth order harmonics, wherein $f_s$ is a stop frequency of the FM sweep signal.

Accordingly, embodiments may provide filtering capabilities to filter out these higher order nonlinearities. Although different implementations are possible, in the embodiment of FIG. 1 this filtering may be performed using an optical filter 140 adapted in the transmit path between an output of the modulation circuitry and an optical transceiver 150, which operates to emit the modulated optical signal and receive a reflected version of this signal. Thus as shown in FIG. 1, after appropriate filtering in optical filter 140, which may be implemented as a bandpass filter, the higher order nonlinearities are at least substantially removed, realizing a linear output.

Although embodiments are not limited in this regard, in one implementation, optical filter 140 may be implemented as a cascaded Mach-Zehnder interferometer (MZI) (e.g., 3 or more cascaded MZIs). In each MZI, a delay line can be used as tunable optical filter element to obtain a target filter response including passband, isolation, etc. While tuning may occur in different manners, in one embodiment the control of frequency and shape (bandwidth and isolation) of optical filter 140 may be done by tuning the delay line, e.g., thermally using a heater. In other embodiments, optical filter 140 may be implemented using a micro-ring resonator, or a cascade of several such micro-ring resonators.

Still referring to FIG. 1, in the receive path incoming reflected signals received in transceiver 150 are provided to an optical coupler 160, which may be implemented as a 2×2 optical coupler to mix the incoming signal with a portion of the original laser energy tapped from the transmitting laser (which is used as a local oscillator at the receiver end for coherent detection). In turn, the resulting signal is provided to balance photodetectors 170, which convert the optical signal to electrical energy, and in turn to a transimpedance amplifier 180, which converts the current signals from photodetectors 170 to voltage signals. More particularly, transimpedance amplifier 180 may output a radio frequency (RF) signal. As shown, the RF signal is provided to signal processing circuitry 190. Signal processing circuitry 190 may process the RF signal to determine range and speed, e.g., of one or more objects in a vicinity. Understand that signal processing circuit 190 may send processed information, e.g., image feedback information to additional processing circuitry of a system, which may be used for autonomous vehicle driving.

Frequency modulation continuous wave (FMCW) LIDAR may be attractive for advanced LIDAR applications such as autonomous vehicles with advantages including cost-effective implementation, robustness to background noises over conventional time-of-flight and direct detection LIDAR. Single side band (SSB) in in-phase and quadrature phase modulator (SSB IQM) may be an effective way to achieve fast frequency sweep and simple structure compared with FM from laser. FMCW uses linear FM for coherent LIDAR detection. However, FM from SSQ IQM may, without an embodiment, suffer a large nonlinear distortion, which can impact the resolution and accuracy in LIDAR coherent LIDAR.

FIG. 1 shows a FMCW based on SSB IQM and coherent detection. In general, signal generation circuit 115 can generate an IQ modulation signal using the following formulae:

$$V_I(t) = V_D \cos\left(2\pi f_b t + \pi\left(\frac{f_s - f_b}{T}\right)t^2\right) \quad (1)$$

$$V_Q(t) = V_D \sin\left(2\pi f_b t + \pi\left(\frac{f_s - f_b}{T}\right)t^2\right) \quad (2)$$

Where $V_D$ is driving voltage, $f_b$ and $f_s$ are the begin and stop of a frequency sweep for FM, and T is a sweep period. To generate FM, each modulator of I and Q is biased at a null point and IQM is biased at quadrature point. The optical field at the modulator output can be expressed by:

$$E_0(t) = E_i\left[\sin\left(\frac{\pi V_I(t)}{V_\pi}\right)\cos(2\pi f_0 t) + \sin\left(\frac{\pi V_Q(t)}{V_\pi}\right)\sin(2\pi f_0 t)\right] \quad (3)$$

Where $E_i$ is the constant input optical field, $V_\pi$ is the voltage required for $\pi$ phase shift in either I or Q modulator. If $\pi V_D/V_\pi \ll 1$, formulae (3) can be derived as below.

$$E_0(t) = E_s\cos\left[2\pi f_0 t - \left(2\pi f_b t + \pi\left(\frac{f_s - f_b}{T}\right)t^2\right)\right] \quad (4)$$

Where $$a = \frac{\pi V_D}{V_\pi}$$

is a parameter to represent the modulation depth for FM, and $E_s = aE_i$ is the constant output optical field.

However, $\pi V_D/V_\pi \ll 1$ means lower modulation depth and thus lower dynamic range of FM, because a higher $\pi V_D/V_\pi$ will generate large nonlinear signals which will degrade the resolution and accuracy for coherent LIDAR detection. Pre-compensation in high $\pi V_D/V_\pi$ operation may compensate the nonlinear distortion to achieve linear FM as described in equation (3); but a complicated calibration is required, for example, because a pre-compensation is dependent on driver voltage.

Thus FIG. 1 illustrates a linear FM based on SSB IQM and coherent detection for LIDAR with an optical BPF, in accordance with an embodiment. FIG. 1 shows an embodiment of frequency sweep design for FM with SSB IQM which has the frequency range of nonlinear signals higher than the stop frequency of a linear FM sweep signal. The nonlinear signals can be filtered by either an optical BPF (as in FIG. 1) or a RF BPF (as in FIG. 2). The achieved linear FM of a large dynamic range improves the resolution and accuracy of LIDAR detection, which may overcome the nonlinear limitations from legacy single side band IQM.

An accurate approximation of sin(x) around x=0 can be expressed by $$\sin(x) = x - \frac{x^3}{6} + \frac{x^5}{120} - \cdots \quad (5)$$

Equation (5) may be derived with high order nonlinear terms as below.

$$\sin(a\cos(f_m)) = \quad (6)$$
$$\left(a - \frac{a^3}{8} + \frac{a^5}{192}\right)\cos(f_m) - \left(\frac{a^3}{24} + \frac{a^5}{384}\right)\cos(3f_m) + \frac{a^5}{1920}\cos(5f_m) + \cdots$$

$$\sin(a\sin(f_m)) = \quad (7)$$
$$\left(a - \frac{a^3}{8} + \frac{a^5}{192}\right)\sin(f_m) - \left(\frac{a^3}{24} + \frac{a^5}{384}\right)\sin(3f_m) + \frac{a^5}{1920}\sin(5f_m) + \cdots$$

Where $$a = \frac{\pi V_D}{V_\pi}$$

and $$f_m = 2\pi f_b t + \pi\left(\frac{f_s - f_b}{T}\right)t^2.$$

Optical field can be expressed by:

$$E_0(t) \approx E_{s1}\cos\left[2\pi f_0 t - \left(2\pi f_b t + \pi\left(\frac{f_s - f_b}{T}\right)t^2\right)\right] + E_N(t) \quad (8)$$

Where $$E_{s1} = E_S\left(1 - \frac{a^2}{8} + \frac{a^4}{192}\right)$$

is a linear FM signal, $E_s$ is ideal signal derived from $\sin(x)=x$, $E_n$ is a total of high order nonlinear contributions and can be expressed by:

$$E_N(t) \approx \quad (9)$$
$$E_S\left\{\left(-\frac{a^2}{24} + \frac{a^4}{384}\right)\cos[2\pi f_0 t + 3f_m(t)] + \left(\frac{a^4}{1920}\right)\cos[2\pi f_0 t - 5f_m(t)]\right\}$$

Where $$f_m(t) = 2\pi f_b t + \pi\left(\frac{f_s - f_b}{T}\right)t^2$$

representing sweep frequency function, and $3f_m$ (t) and $5f_m$ (t) representing $3^{rd}$ and $5^{th}$ order nonlinear contributions, respectively. In the derivations and following simulations, the higher order nonlinear terms and signals are not shown since their contributions are ignorable for $$\frac{V_D}{V_\pi}$$

operating range for FMCW LIDAR applications.

In embodiments, a sweep frequency may be defined that has $f_s<3f_b$ so that an optical BPF may filter the nonlinear signals and thus reduce or eliminate nonlinear impact for a large dynamic range of FM. Furthermore, in a coherent detection, a high power local oscillator (LO) can boost optical linear sweep signal and nonlinear signals to make that the beat terms among optical linear sweep signal and nonlinear signals are ignorable at photodetectors. Therefore, a RF BPF after photodetectors can be used to filter the nonlinear signals, which may be dominated by the beat signal between LO and optical nonlinear signals, and, as a result, the linear sweep signal, which may be dominated by the beat signal between LO and optical linear sweep signal, can be achieved.

Note that in an embodiment much of the circuitry shown in FIG. 1 may be implemented on a single die of a photonic integrated circuit (PIC). For example, a PIC may include all circuitry other than signal generation circuit 115 and signal processing circuitry 190. In other cases, the receive path may be implemented separately from the transmit path. Of course other implementations are possible. For example laser 105 may be implemented externally to the PIC.

Figure 2:
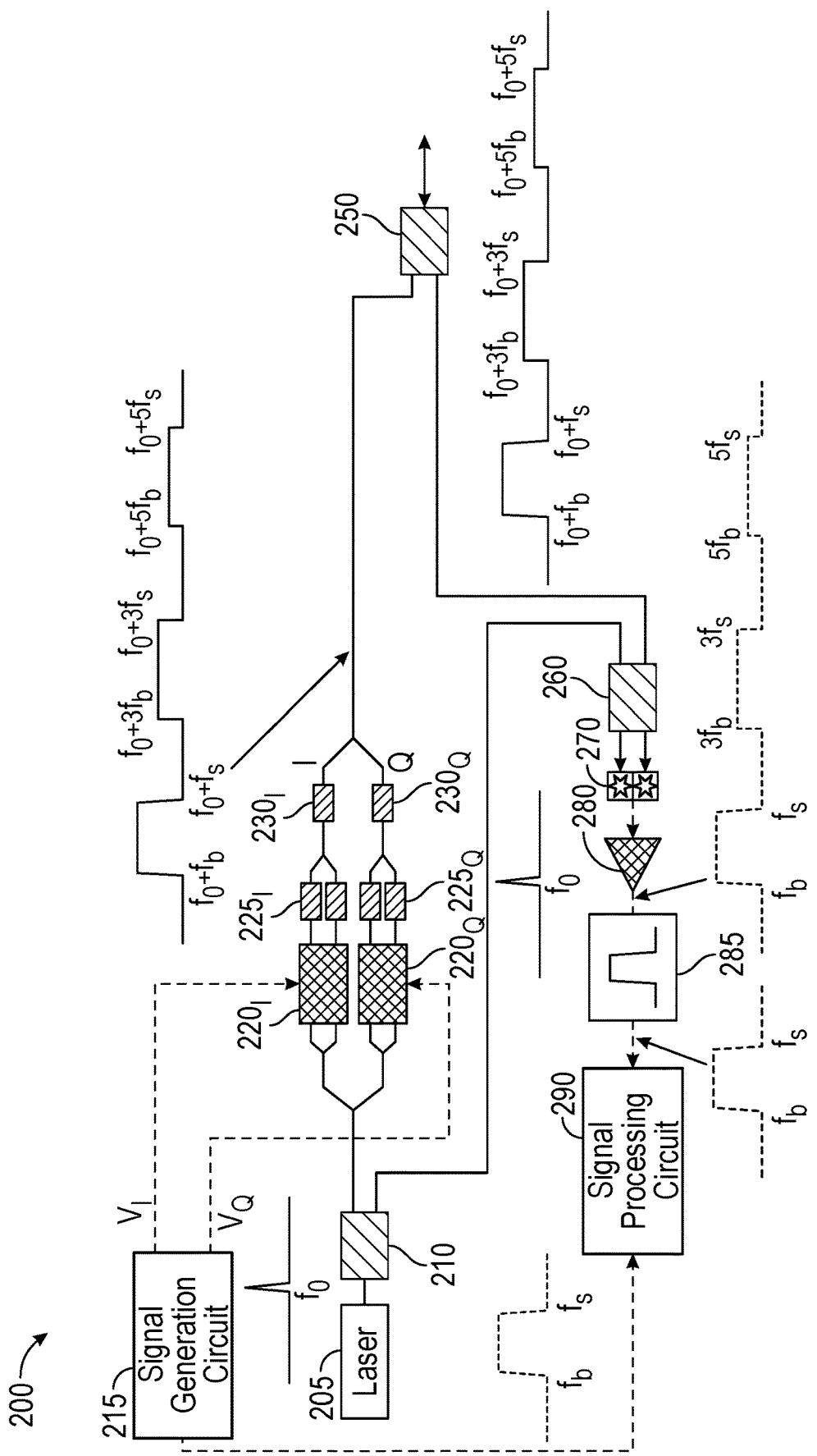
FIG. 2 is a block diagram of an apparatus in accordance with another embodiment.

In another embodiment, rather than filtering optical signals before they are output, filtering may be performed electrically on reflected signals. Referring now to FIG. 2, illustrated is a linear FM based on SSB IQM and coherent detection for LIDAR with a RF BPF 285, in accordance with various embodiments. The system of FIG. 2 may be similar to the system of FIG. 1, however, an RF BPF is used as shown to filter nonlinear signals (and not including an optical filter). Note that many of the components in FIG. 2 may be generally similarly configured the same as system 100 of FIG. 1 (and thus reference numerals generally refer to the same components, albeit of the "200" series in place of the "100" series of FIG. 1).

In various embodiments, RF filter 285 may be implemented using discrete components, including resistors, inductors and capacitors (such as an RLC network). In other implementations RF filter 285 may be a microstrip filter, e.g., manufactured using a CMOS process integrated in a transimpedance amplifier 280 in FIG. 2.

Still other implementations are possible. For example, in some cases a system may provide for filtering on both transmit and receive paths. Note that in general, it may be more desirable when providing for only a single filtering mechanism, to filter signals on either the transmit path or the receive path, or both.

Figure 3:
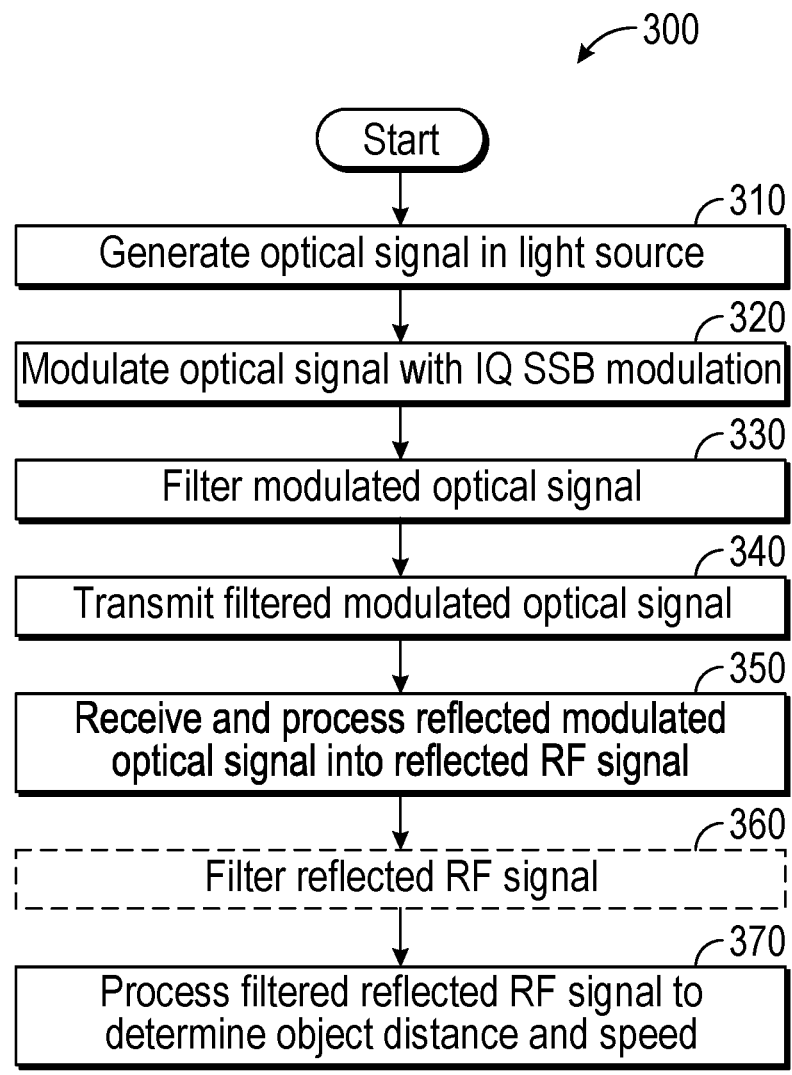
FIG. 3 is a flow diagram of a method in accordance with an embodiment.

Referring now to FIG. 3, shown is a flow diagram of a method in accordance with an embodiment. As shown in FIG. 3, method 300 is a method for operating a LIDAR system having filtering capabilities as described herein. As such, method 300 may be performed by a LIDAR system such as one of those shown in FIG. 1 or 2, as examples. More particularly, the various hardware components, alone, or in combination with additional hardware, firmware and/or software, may perform method 300. For example, understand that in addition to the transmit and receive paths including filtering hardware, a control circuit such as a hardware controller may initially configure the system including the one or more bandpass filters to process the signals according to desired operating parameters. The operating parameters may include sweep start and stop frequencies, optical filtering characteristics (e.g., passband and isolation parameters) and so forth.

As illustrated, method 300 begins at block 310 by generating light in a light source. For example, a laser may be controlled to perform CW laser generation to output an optical signal. Next at block 320, this optical signal may be modulated with IQ SSB modulation, e.g., in a modulator as described herein. With a given modulator, undesired nonlinearities may cause higher order noise, e.g., at harmonics of the sweep frequency range.

With embodiments, at block 330 the modulated optical signal may be filtered. For example, an optical bandpass filter that couples to an output of the modulator may perform bandpass filtering such that only a given bandwidth (e.g., between approximately 2.5 to 6.5 GHz) is passed. In turn, this filtered modulated optical signal may be transmitted from an optical transceiver (block 340).

Understand that this transmitted optical signal may be reflected off one or more objects in a vicinity of the LIDAR system. Accordingly, such reflected signals may be received in the LIDAR system (block 350). For example, the optical transceiver may receive this reflected energy and provide it to further circuitry that additionally processes the optical signal and converts it into an electrical signal, e.g., at an RF frequency.

Still referring to FIG. 3, at optional block 360 this reflected RF signal may be filtered in an RF bandpass filter. That is, as described above in certain implementations both an optical bandpass filter and an electrical bandpass filter may be present. Of course understand that in other implementations there may be no reason to perform this RF filtering depending upon use case and capability of the optical bandpass filter. Still further in other embodiments, there may be no optical bandpass filter, and instead only an RF bandpass filter may be present.

In any case, the reflected RF signal may be further processed, e.g., in a signal processor to determine object distance and speed (block 370). Note that such determination may be based on communication of a large number of optical signals and received reflected signals. For example, for a given time duration, millions of these signals may be generated, received and further processed in order to develop 3D image information to identify one or more objects in a vicinity.

While not shown in FIG. 3, understand that such processed information may be combined with additional image information from other LIDARs, e.g., present in a vehicle environment to obtain real-time information of objects present in a vicinity for use in autonomous vehicle operation. Understand that while shown at this high level in the embodiment of FIG. 3, many variations and alternatives are possible.

Figure 4A:
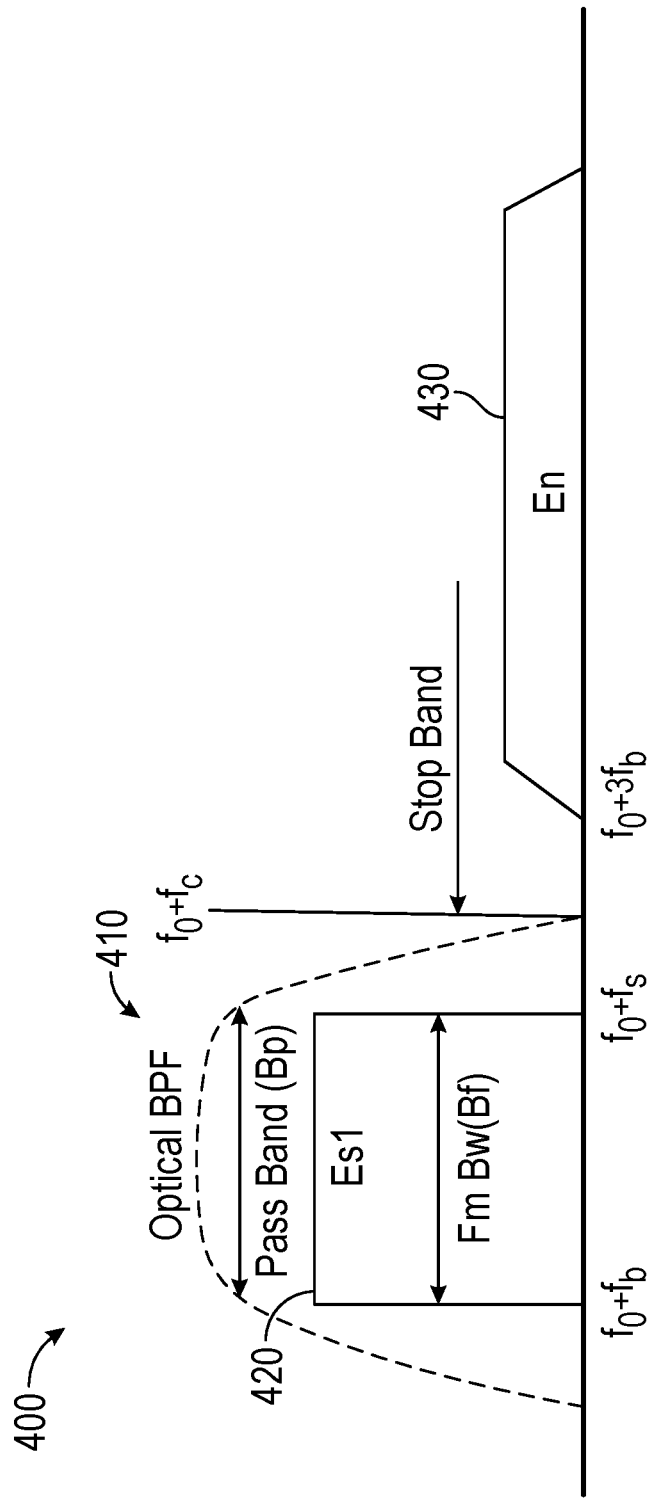
FIG. 4A shows an optical bandpass filter and FIG. 4B shows a radio frequency bandpass filter for use in accordance with an embodiment.
Figure 4B:
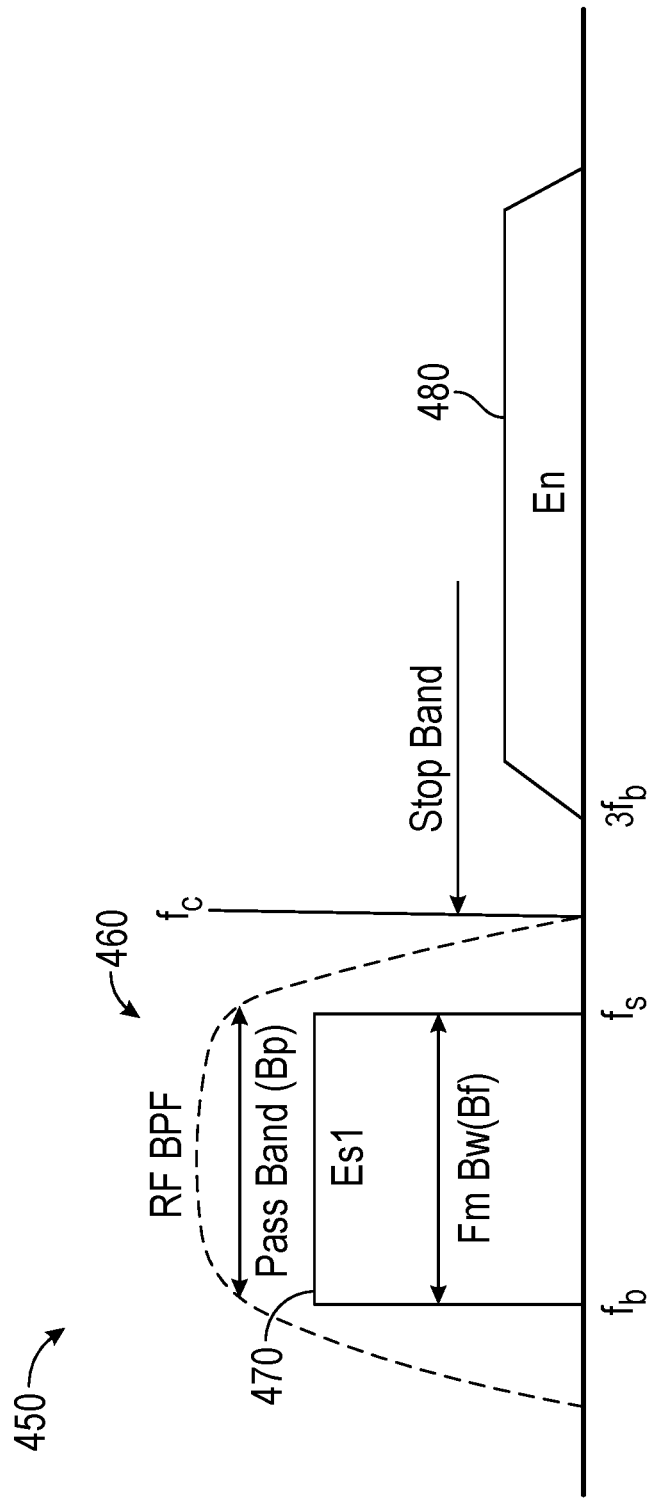

As shown in FIGS. 4A and 4B, embodiments described herein may be directed to an optical or a RF BPF to filter the nonlinear signals for linear FM. FIG. 4A shows an optical BPF and FIG. 4B shows an RF BPF design for linear FMCW based on SSB IQM and coherent detection, where the BPF is designed to have enough pass band, $B_p > B_f = f_s - f_b$, for linear sweep signal, and the low frequency cut off of stop-band is lower than minimum frequency of nonlinear signals, $f_o + f_c < f_o + 3f_b$, to filter the nonlinear signals.

FIG. 4A illustrates an environment 400 having an optical BPF, in accordance with various embodiments. In particular, FIG. 4A shows a filter design of an optical BPF 410 for linear FMCW based on SSB IQM and coherent detection, where BPF 410 is designed to have enough pass band 420, $B_p > B_f = f_s - f_b$, for a linear sweep signal, and the low frequency cut off of stop-band is lower than minimum frequency of nonlinear signals, $f_o + f_c < f_o + 3f_b$, to filter nonlinear signals 430.

FIG. 4B illustrates an environment 450 having a RF BPF, in accordance with various embodiments. In particular, FIG. 4B shows a filter design of an RF BPF 460 for linear FMCW based on SSB IQM and coherent detection, where BPF 460 is designed to have enough pass band 470, $B_p > B_f = f_s - f_b$, for linear sweep signal, and the low frequency cut off of stop-band is lower than minimum frequency of nonlinear signals 480, $f_c < 3f_b$ to filter the nonlinear signals.

Figure 5:
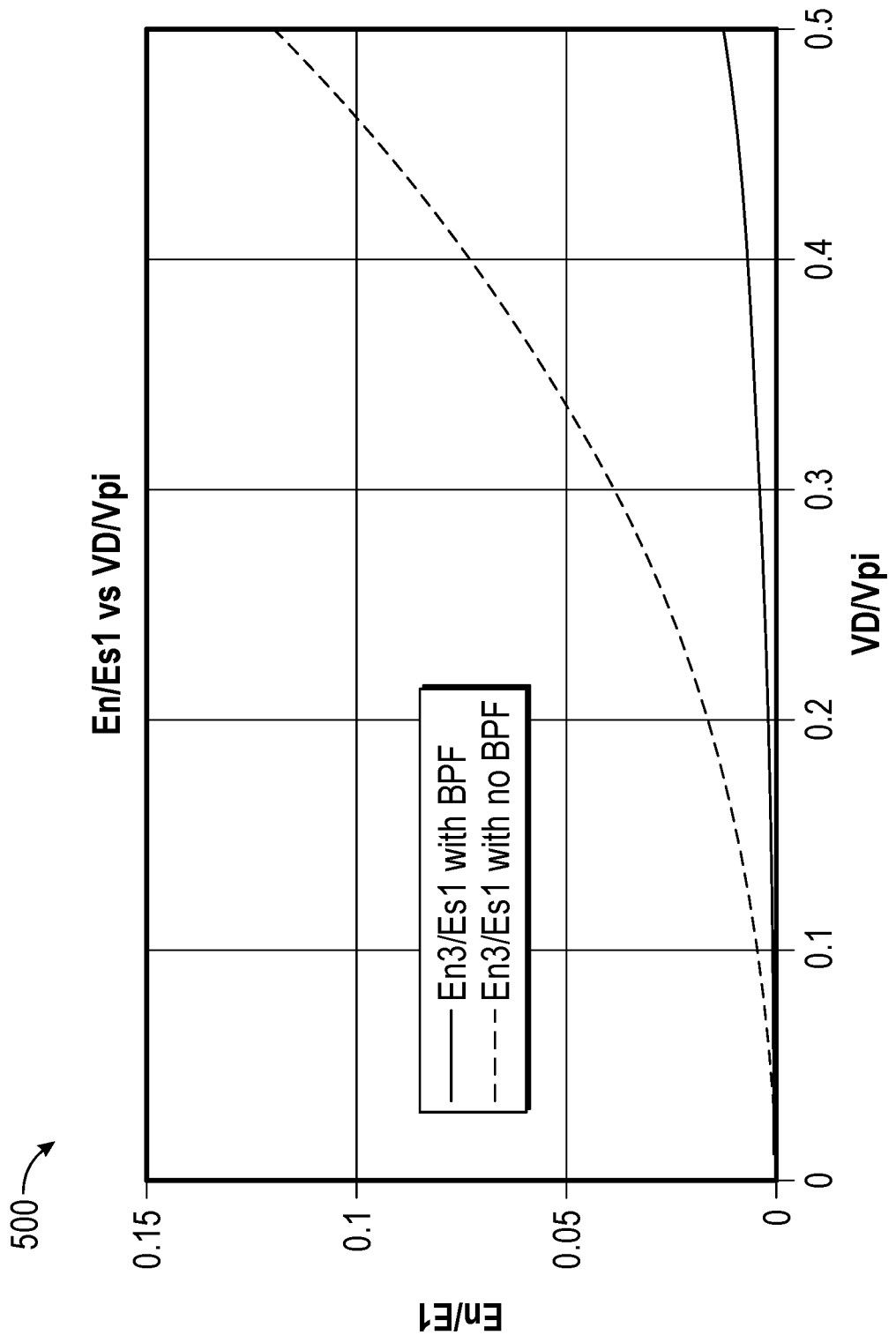
FIG. 5 is a diagram that shows a performance comparison using a BPF versus using no BPF, in accordance with various embodiments.

FIG. 5 is a diagram that shows a performance comparison using a BPF versus using no BPF, in accordance with various embodiments. In particular, FIG. 5 shows $E_{n3}/E_{s1}$ vs $V_D/V_\pi$, with and without BPF with 20 dB attenuation at the stop band of an optical BPF. The diagram shows that what $E_{n3}/E_{s1}$ can be <0.01 when $V_D/V_\pi$ is <45% with 20 dB attenuation at the stop band of an optical BPF.

Table 1 below is a listing of example design parameters for SSB IQM for FMCW LIDAR, in accordance with various embodiments. In particular, Table 1 includes design parameters as an example design with SSB IQM for FWCW coherent LIDAR.

TABLE 1

| | Design Example | | |
|---|---|---|---|
| | Value | Unit | Comments |
| VD | 3.6 | V | Drive voltage |
| Vpi | 8 | V | MZM phase shifter |

TABLE 1-continued

| | Design Example | | |
|---|---|---|---|
| | Value | Unit | Comments |
| VD/Vpi | 0.45 | ratio | Modulation depth |
| a | 1.41 | ratio | a = VD/Vpi * Pi |
| Es1/Es | 0.77 | Es | Linear FM Signal |
| En3/Es1 | 0.094 | Es | $3^{rd}$ order nonlinear signal |
| En5/Es1 | 0.027 | Es | $5^{th}$ order nonlinear signal |
| En3/Es1 after BPF | 0.009 | Es | 20 dB attenuation at stop band of BPF |
| En5/Es1 after BPF | 0.003 | Es | 20 dB attenuation at stop band of BPF |
| c | 3.E+08 | m/s | optical velocity |
| R | 200 | m | Range of Lidar detection |
| tao | 1.33 | us | Travelling time with 2R distance |
| fb | 3 | GHz | Sweep begin frequency |
| fs | 6 | GHz | Sweep stop frequency |
| Bf | 3 | GHz | sweep bandwidth, fs-fb |
| T | 2 | us | Sweep period |
| r | 1.5 | GHz/us | Sweep rate |
| BPF low f cutoff | 2.5 | GHz | BPF pass band min frequency, <fb |
| BPF high f cutoff | 6.5 | GHz | BPF pass band max frequency, >Bf |
| Bp | 4 | GHz | Pass band of BPF, >Bf |
| low f of En | 9 | GHz | low f of nonlinear signals, 3fb |
| low f of stop band | 8.5 | GHz | low f cut off of stop band of BPF, <3fb |
| Beat signal | 2.0 | GHz | beat signal |
| Resolution | 50 | mm | Linear FM signal |

Note:
Optical carrier frequency f0 is removed in filter design.

Figure 6:
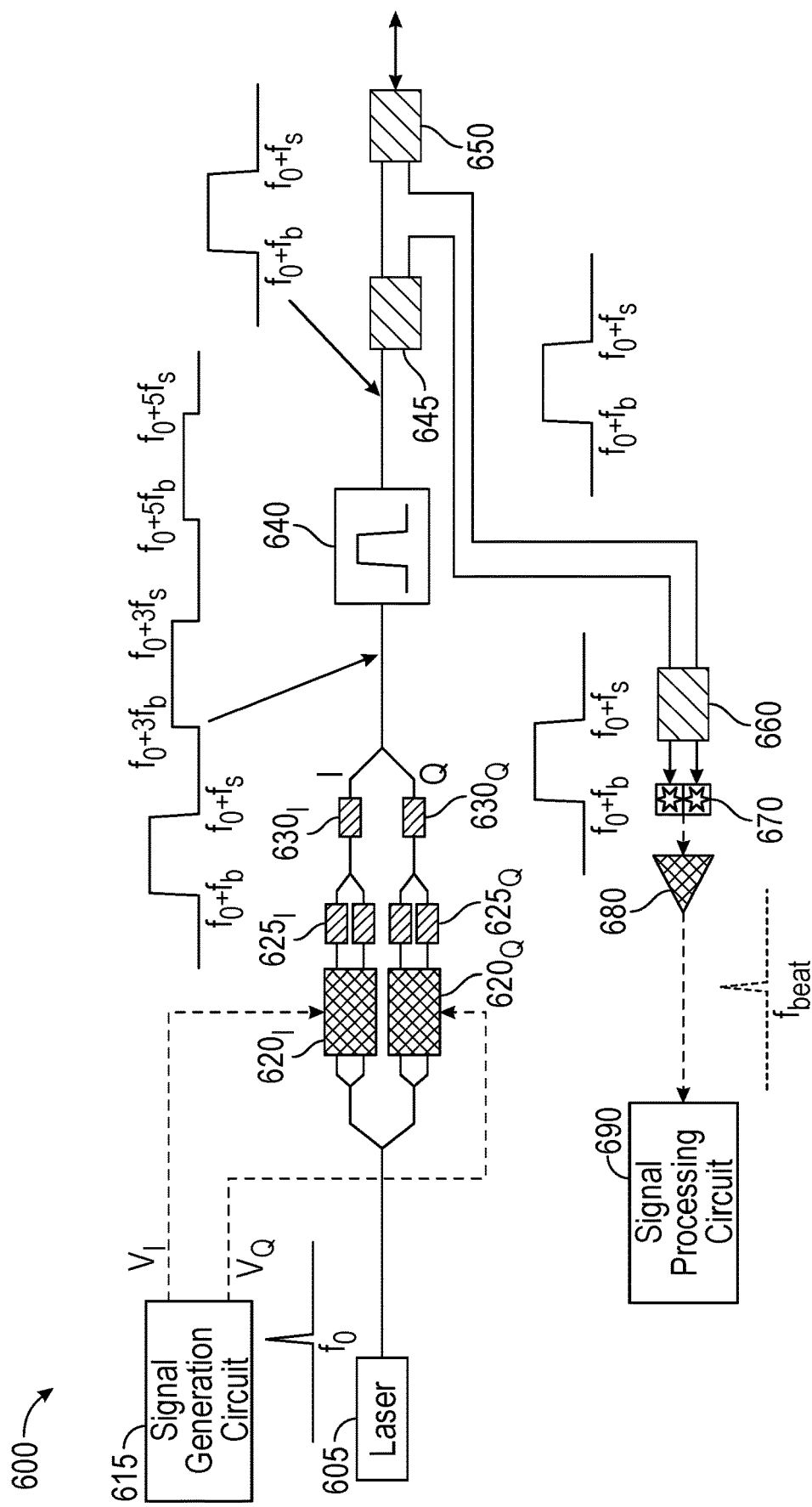
FIG. 6 is block diagram of an apparatus in accordance with yet another embodiment.

FIG. 6 illustrates a linear FM CW based upon SSB IQM and coherent detection, in accordance with various embodiments. In the embodiment of FIG. 6, an example is shown that a linear sweep signal may be used at a local source in coherent detection.

Note that many of the components in FIG. 6 may be generally similarly configured the same as system 100 of FIG. 1 (and thus reference numerals generally refer to the same components, albeit of the "600" series in place of the "100" series of FIG. 1). Optical filter 640 can filter nonlinear signals and thus improve the resolution and accuracy of LIDAR detection with linear FMCW based on SSB IQM and coherent detection where the LO source is split from the transmit source at an optical splitter 645 with frequency sweep for FM, and $f_{beat}$ is the detected frequency to calculate the range of LIDAR, and nonlinear signals are filtered by optical BPF 640.

Figure 7:
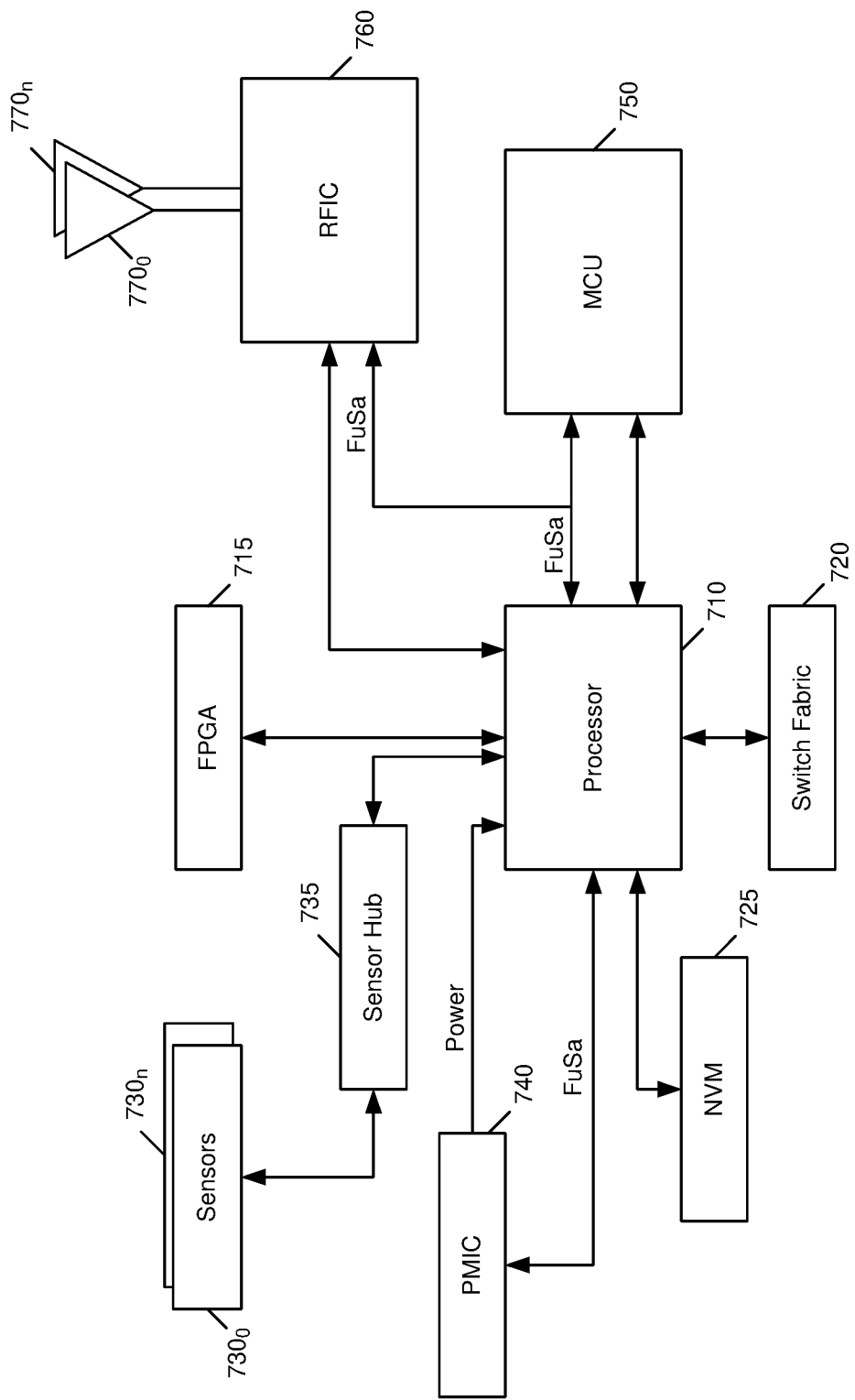
FIG. 7 is a block diagram of a system in accordance with another embodiment of the present invention.

Referring now to FIG. 7, shown is a block diagram of a system in accordance with another embodiment. In the embodiment of FIG. 7, system 700 is an autonomous driving computing system. As such, system 700 may be implemented within a vehicle that provides for some level of autonomous driving. Understand that with different levels of autonomous driving control, different levels of workloads may be executed within system 700 to perform some or all driving tasks autonomously.

As illustrated, system 700 includes a processor 710, which may be a general-purpose multicore processor or other system on chip (SoC). In different implementations, multiple such processors may be implemented to flexibly allocate autonomous driving workloads across these processors. Processor 710 receives power that is controlled by a power management integrated circuit (PMIC) 740. As further illustrated, functional safety and other diagnostic testing as described herein, both within processor 710 and PMIC 740 may occur, with results communicated between these components.

System 700 may further include one or more field programmable gate arrays (FPGAs) 715 or other programmable accelerators to which certain autonomous driving workloads may be offloaded. Processor 710 further couples to a non-volatile memory 725, which in an embodiment may be implemented as a flash memory. To provide communication with other components within a vehicle, processor 710 further couples to a switch fabric 720 which in an embodiment may be implemented as an Ethernet switch fabric that in turn may couple to other components within a vehicle, including display components, vehicle infotainment systems, and so forth.

Still further, processor 710 (and switch fabric 720) also couple to a microcontroller 750 which also may be involved in the functional safety testing. Furthermore, to enable interaction with other systems, including other vehicles, roadway systems, over-the-air update sources, infotainment content sources, sensor data communication and so forth, processor 710 and MCU 750 may couple to one or more radio frequency integrated circuits (RFICs) 760.

In embodiments, RFIC 760 may be configured to support 5G-based specifications for communication of automotive and other data via a variety of wireless networks. To this end, RFIC 760 may couple to one or more antennas $770_0$-$770_n$ of a vehicle.

As further illustrated in FIG. 7, system 700 may include a plurality of sensors $730_0$-$730_n$ that provide sensor information, via a sensor hub 735 to processor 710. Although embodiments are not limited in this regard, such sensors may include one or more LIDAR sensors having filtering capabilities as described herein. In some cases, system 700 may include a rotating LIDAR sensor to monitor an entire vicinity. In other cases, there may be multiple LIDAR sensors, each fixed to monitor a given direction and field of view. These LIDAR sensors may provide image feedback information to processor 710, which may determine a location (e.g., range, and potentially speed) of an object based at least in part on the image feedback information. Additional sensors may include ultrasound, radar and optical sensors, among other sensor types.

Sensor hub 735 may be configured to fuse at least some of this data to provide information regarding the vehicle's surroundings including object detection, range and speed information, for provision to processor 710. In turn, processor 710 and/or FPGA 715 may use this fused sensor information in connection with performing autonomous driving workloads. Understand while shown at this high level in the embodiment of FIG. 7, many variations and alternatives are possible.

The following examples pertain to further embodiments.

In one example, an apparatus includes: a modulator to modulate an optical signal with a FM signal according to IQ SSB modulation to output a modulated optical signal; an optical transceiver to transmit the modulated optical signal and receive a reflection of the transmitted modulated optical signal; and a bandpass filter coupled to at least one of the modulator or the optical transceiver to filter at least one of the modulated optical signal or the reflection of the transmitted modulated optical signal.

In an example, the bandpass filter comprises an optical bandpass filter coupled to an output of the modulator to filter the modulated optical signal and provide the filtered modulated optical signal to the optical transceiver.

In an example, the optical bandpass filter comprises a cascaded Mach-Zehnder interferometer or cascaded micro-ring resonators.

In an example, the bandpass filter comprises a RF bandpass filter coupled to an output of a transimpedance amplifier.

In an example, the RF bandpass filter comprises an RLC network.

In an example, the bandpass filter comprises an optical bandpass filter and a RF bandpass filter.

In an example, the apparatus further comprises a signal generator to generate the FM signal having a sweep begin frequency equal to or greater than 3 GHz and a sweep stop frequency equal to or less than 6 GHz.

In an example, the bandpass filter is to filter frequencies less than the sweep begin frequency and greater than the sweep stop frequency.

In an example, the apparatus comprises a photonic integrated circuit having the modulator, the optical transceiver, and the bandpass filter.

In an example, the apparatus further comprises a controller to control a bandwidth of the bandpass filter.

In another example, a method comprises: modulating, in a IQ SSB modulator, an optical signal with a FM signal to output a modulated optical signal; filtering, in a bandpass filter coupled to the IQ SSB modulator, the modulated optical signal; and transmitting, via an optical transmitter, the modulated optical signal.

In an example, the method further comprises receiving, in an optical receiver, a reflection of the transmitted modulated optical signal.

In an example, the method further comprises filtering, in a second bandpass filter coupled to the optical receiver, the reflection of the transmitted modulated optical signal.

In an example, the method further comprises: filtering the modulated optical signal in an optical bandpass filter comprising a cascaded Mach-Zehnder interferometer or cascaded micro-ring resonators; and filtering the reflection of the transmitted modulated optical signal in a radio frequency filter comprising an RLC network.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises: one or more LIDAR sensors to communicate optical signals, each of the one or more LIDAR sensors including an IQ SSB modulator to modulate an optical signal with a FM sweep signal and at least one of an optical filter or a RF filter to filter nonlinearities of the IQ SSB modulator; and a processing circuit coupled to the one or more LIDAR sensors to receive image feedback information from the one or more LIDAR sensors and to determine a location of an object based at least in part on the image feedback information.

In an example, the optical filter comprises a cascaded Mach-Zehnder interferometer or cascaded micro-ring resonators.

In an example, the RF filter comprises an RLC network.

In an example, the one or more LIDAR sensors comprise the optical filter and the RF filter.

In an example, the one or more LIDAR sensors further comprise a signal generator to generate the FM sweep signal having a sweep begin frequency equal to or greater than 3 GHz and a sweep stop frequency equal to or less than 6 GHz.

In an example, the optical filter is to filter frequencies less than the sweep begin frequency and greater than the sweep stop frequency.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus, comprising:
a modulator to modulate an optical signal with a frequency modulated (FM) signal according to IQ single sideband (SSB) modulation to output a modulated optical signal;
a signal generator to generate the FM signal having a sweep begin frequency equal to or greater than 3 gigahertz (GHz) and a sweep stop frequency equal to or less than 6 GHZ;
an optical transceiver to transmit the modulated optical signal and receive a reflection of the transmitted modulated optical signal; and
a bandpass filter coupled to at least one of the modulator or the optical transceiver to filter at least one of the modulated optical signal or the reflection of the transmitted modulated optical signal, wherein the bandpass filter is to filter frequencies less than the sweep begin frequency and greater than the sweep stop frequency.

2. The apparatus of claim 1, wherein the bandpass filter comprises an optical bandpass filter coupled to an output of the modulator to filter the modulated optical signal and provide the filtered modulated optical signal to the optical transceiver.

3. The apparatus of claim 2, wherein the optical bandpass filter comprises a cascaded Mach-Zehnder interferometer or cascaded micro-ring resonators.

4. The apparatus of claim 1, wherein the bandpass filter comprises a radio frequency (RF) bandpass filter coupled to an output of a transimpedance amplifier.

5. The apparatus of claim 4, wherein the RF bandpass filter comprises an RLC network.

6. The apparatus of claim 1, wherein the bandpass filter comprises an optical bandpass filter and a radio frequency (RF) bandpass filter.

7. The apparatus of claim 1, wherein the apparatus comprises a photonic integrated circuit having the modulator, the optical transceiver, and the bandpass filter.

8. The apparatus of claim 1, further comprising a controller to control a bandwidth of the bandpass filter.

9. A method, comprising:
modulating, in an IQ single sideband (SSB) modulator, an optical signal with a frequency modulated (FM) signal to output a modulated optical signal;
filtering, in a first bandpass filter coupled to the IQ SSB modulator, the modulated optical signal, wherein the first bandpass filter comprises a cascaded Mach-Zehnder interferometer or cascaded micro-ring resonators;
transmitting, via an optical transmitter, the modulated optical signal;
receiving, in an optical receiver, a reflection of the transmitted modulated optical signal;
filtering, in a second bandpass filter coupled to the optical receiver, the reflection of the transmitted modulated optical signal, wherein the second bandpass filter comprises an RLC network.

10. The method of claim 9, further comprising generating the FM signal having a sweep begin frequency and a sweep stop frequency.

11. The method of claim 10, wherein the sweep begin frequency is equal to or greater than 3 gigahertz (GHz) and the sweep stop frequency is equal to or less than 6 GHz.

12. The method of claim 11, wherein the first bandpass filter and/or the second bandpass filter are to filter frequencies less than the sweep begin frequency and greater than the sweep stop frequency.

13. An apparatus, comprising:
a modulator to modulate an optical signal with a frequency modulated (FM) signal according to IQ single sideband (SSB) modulation to output a modulated optical signal;
a signal generator to generate the FM signal having a sweep begin frequency and a sweep stop frequency;
an optical transceiver to transmit the modulated optical signal and receive a reflection of the transmitted modulated optical signal; and
a bandpass filter coupled to at least one of the modulator or the optical transceiver to filter at least one of the modulated optical signal or an electrical signal corresponding to the reflection of the transmitted modulated optical signal, wherein the bandpass filter is to filter frequencies less than the sweep begin frequency and greater than the sweep stop frequency.

14. The apparatus of claim 13, wherein the sweep begin frequency is not less than twice the sweep stop frequency.

15. The apparatus of claim 14, wherein the sweep begin frequency is equal to or greater than 2.5 gigahertz (GHz) and the sweep stop frequency is equal to or less than 6.5 GHz.

16. The apparatus of claim 13, wherein the bandpass filter comprises an optical bandpass filter to filter the modulated optical signal and provide the filtered modulated optical signal to the optical transceiver.

17. The apparatus of claim 13, wherein the bandpass filter comprises a radio frequency (RF) bandpass filter to filter the electrical signal corresponding to the reflection of the transmitted modulated optical signal.

18. The apparatus of claim 13, wherein the bandpass filter comprises an optical bandpass filter and a radio frequency (RF) bandpass filter.

19. The apparatus of claim 13, wherein the apparatus comprises a photonic integrated circuit having the modulator, the optical transceiver, and the bandpass filter.

* * * * *